United States Patent
Mizes et al.

(10) Patent No.: US 7,492,381 B2
(45) Date of Patent: Feb. 17, 2009

(54) COMPENSATION OF MPA POLYGON ONCE AROUND WITH EXPOSURE MODULATION

(75) Inventors: Howard Mizes, Pittsford, NY (US); Peter Paul, Webster, NY (US); Jack LeStrange, Macedon, NY (US); Nancy B. Goodman, Webster, NY (US); R. Enrique Viturro, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 436 days.

(21) Appl. No.: 11/315,978

(22) Filed: Dec. 21, 2005

(65) Prior Publication Data

US 2007/0139509 A1     Jun. 21, 2007

(51) Int. Cl.
    *B41J 2/385*     (2006.01)
    *B41J 2/435*     (2006.01)
    *G06F 15/00*     (2006.01)

(52) U.S. Cl. ........................ 347/129; 358/1.9; 347/232

(58) Field of Classification Search ................ 347/129, 347/232; 358/1.9
See application file for complete search history.

(56) References Cited

U.S. PATENT DOCUMENTS

| | | | | |
|---|---|---|---|---|
| 4,257,053 A | * | 3/1981 | Gilbreath | 347/261 |
| 5,737,006 A | * | 4/1998 | Wong | 347/235 |
| 5,966,231 A | * | 10/1999 | Bush et al. | 359/204 |
| 2003/0063183 A1 | * | 4/2003 | AuYeung et al. | 347/246 |
| 2005/0275855 A1 | * | 12/2005 | Mizes et al. | 358/1.9 |

* cited by examiner

*Primary Examiner*—Manish S Shah
*Assistant Examiner*—Sarah Al-Hashimi
(74) *Attorney, Agent, or Firm*—Richard H. Krukar; Kermit D. Lopez; Luis M. Ortiz

(57) ABSTRACT

Many xerographic machines have a motor polygon assembly (MPA), which is a rotating polygonal mirror. As the MPA rotates, it reflects a modulated light beam to produce scan lines on a photoreceptor. Inconsistencies in the MPA can cause inconsistencies in the scan lines, and therefore banding in a printed document. Misalignment, improper mounting, improper manufacture, or sources can cause the MPA inconsistencies. The banding is periodic, can be measured and can be compensated for. Although the modulated light beam can be modulated by many sources, further modulation using a compensation source can reduce banding.

22 Claims, 5 Drawing Sheets

COMPENSATION OF MPA POLYGON ONCE AROUND WITH EXPOSURE MODULATION

TECHNICAL FIELD

Embodiments are generally related to printing methods and systems. Embodiments are also related to xerographic printing methods and systems. Embodiments are additionally related to compensating for irregularities in the manufacture, mounting, alignment and other factors of a motor polygon assembly (MPA) via a compensation source that is used to modulate the intensity of the light beams reflected by the MPA.

BACKGROUND

Xerography is a process wherein toner is selectively transferred onto a substrate and then fused. Initially, the toner is in a sump from which it is developed onto a photoreceptor. Often, the photoreceptor is a drum with a photoconductive coating. Using principals of static electricity, the surface of the photoreceptor receives an electrical charge. A light beam scanned over the surface of the photoreceptor can selectively discharge the photoreceptor surface. The toner is then developed onto the photoreceptor where it adheres, due to electrostatic attraction, to those regions of the photoreceptor that have been discharged. The photoreceptor is thereby coated with patterned toner.

A substrate, such as paper, can also receive an electrical charge. The substrate can be given a larger electrical charge than the photoreceptor so that the patterned toner is transferred to the substrate when the photoreceptor contacts it. The substrate is then heated and pressed so that the patterned toner fuses to the substrate surface. Those skilled in the arts of printing, photocopying, and xerography know the details of the xerographic process, the components used in the xerographic process, and the variations in the process details and components that occur in different embodiments of xerography.

When a drum photoreceptor is used, the drum rotates past the charging device, the exposure device, and the development device. The direction that the drum rotates is the process direction.

A light beam scanning across the photoreceptor can discharge the electric charge on the surface of the photoreceptor. Tracing a light beam across the photoreceptor creates a line, called a scan line. Turning the light beam on and off during a scan can cause selective discharging along the scan line. Making many scan lines as the photoreceptor moves with respect to the scanning beam can cause selective discharging within an area.

For example, a laser printer can have a light beam that sweeps across the surface of the photoreceptor 6000 times per second, and a photoreceptor that moves, such as a drum rotating, at ten inches per second. The printer produces 600 scan lines per inch along the process direction because the photoreceptor is moving. If the photoreceptor is 10 inches wide, modulating the light beam so that it can change 6000 times as it sweeps the photoreceptor in the less than 1/6000 of a second it takes to move across the photoreceptor results in a 600 dot per inch resolution perpendicular to the process direction.

FIG. 4, labeled as prior art, illustrates one way to obtain a modulated light beam. A laser 401 produces a light beam 403 that passes through a modulator 402 to produce a modulated light beam 107. Those skilled in the art of optoelectronics know of many devices that can modulate light beams or laser beams.

FIG. 5, labeled as prior art, illustrates another way to obtain a modulated light beam. A laser diode 501 can produce a modulated light beam 107 directly without the need for a separate modulator such as the modulator 402 of FIG. 4.

In the example above, a laser printer produced 600 scan lines per inch at a process speed of 10 inches per second. One technique to produce a higher process speed is to sweep the laser at a higher rate across the photoreceptor. Another solution is to produce many scan lines concurrently. Producing many scan lines concurrently requires many modulated light beams.

FIG. 6, labeled as prior art, illustrates one way to obtain multiple light beams. A source light beam 601 passes into a splitter 602 that splits it into numerous light beams 403. Those skilled in the art of optics know of many devices and combinations of devices for use as a splitter 602. The numerous light beams 403 can then each be modulated individually. In some applications, it can be advantageous to modulate the source light beam 601 such that it is split into numerous modulated light beams. Using numerous laser diodes or similar subassemblies can also produce numerous modulated light beams.

FIG. 7, labeled as prior art, illustrates a motor polygon assembly (MPA) 108 causing numerous modulated light beams 107 to concurrently produce multiple scan lines 113 on a substrate 112. The MPA 108 is an optical element that has many facets arranged around a rotational axis. As the MPA spins, each facet reflects the modulated light beams 107 and causes them to scan across the substrate 112 creating scan lines 113. A new set of scan lines begins as each facet starts reflecting the modulated light beams 107. Advancing the substrate along the process direction controls the locations of the new scan lines.

As with any printed output machine, a xerographic engine can exhibit print density variation. One type of print density variation is banding perpendicular to the process path. Common sources of banding are irregularity in the facets of the MPA, vibrations of the MPA, improper rotation of the MPA, and variations in the spacing and intensity of a multiple beam MPA. The effect is that the light beams sweeping across the photoreceptor have varying intensities and spacings. The differences in the intensity and spacing cause differences in discharging of the photoreceptor surface and ultimately differences in amount of toner developed onto the photoreceptor and transferred and fused to the substrate. When the exposure subsystem is the source of the banding, the period of banding in scan lines is often a multiple of or a subharmonic of the number of facets in the polygon. For example, a MPA with 16 facets has a single facet that doesn't reflect as strongly as the others. If the MPA is reflecting a single light beam to produce a single scan line at a time, then the bad facet will less efficiently discharge the photoreceptor once every 16 lines, resulting in lighter development with the same period. If two light beams are reflected to produce two scan lines concurrently, then thirty good scan lines are followed by two bad scan lines in a repeating pattern.

A need therefore exists for systems and methods that can compensate for banding due to MPA issues. Such a goal can be accomplished by changing the intensity of the light beams on a facet-by-facet basis in a way that compensates the banding on the print.

BRIEF SUMMARY

Aspects of the embodiments address limitations and flaws in the prior art by producing and storing a beam intensity table. As the polygon rotates and different facets are presented to the laser beam, an appropriate intensity is chosen for the laser which is maintained across that particular scan line.

Therefore, it is an aspect of the embodiments to spin a motor polygon assembly (MPA) that has N facets arranged around a rotational axis. The MPA reflects the incident light beams. As the MPA spins, each reflected light beam passes through subsequent optics that cause it to trace a scan line across a photoreceptor. As the MPA spins, the light beams are reflected off different facets in turn. One light beam reflecting off one facet traces one scan line. When the next facet rotates into position, the light beam traces a second scan line. As such, an MPA with N facets reflecting M light beams traces M*N scan lines per MPA revolution. As the MPA spins and scan lines are traced, the photoreceptor advances to control the location of each set of M scan lines.

It is also an aspect of the embodiments to use modulated light beams that are reflected from the MPA. The modulated light beams are modulated based on a variety of modulation sources. One modulation source is the image being printed. The content of the image being printed will determine whether the light should be on or off. Another modulation source is the current compensation. The current compensation can take on one of N compensation values, one for each facet of the MPA. Each compensation value uniquely corresponds to a MPA facet. During the time that a facet is reflecting a modulated light beam, the facet's corresponding compensation value is used as the current compensation and thereby to adjust the intensity of the modulated light beam.

It is an aspect of certain embodiments related to a multiple beam MPA printing with M beams, that when the intensity of each beam can be individually controlled, then the current compensation can take on one of N*M compensation values, one for each beam that illuminates each facet of the MPA.

A new scan line is started and the current compensation takes a different compensation value whenever a new facet rotates into position. Those skilled in the art of MPA design know of techniques to create a start of scan (SOS) pulse that is generated a known amount of time before the video from the image corresponding to that particular scan line should be used to modulate the laser and produce the latent image. The same SOS pulse can be used to trigger the change in the current compensation. Alternatively, a unique sensor can be used to trigger the change in the current compensation. The compensation intensity table can be a circular buffer of N elements. In other words, the compensation intensity table can have N compensation values arranged in order. Upon detecting a new facet rotating into position, the next compensation value after the current one is obtained and passed to the modulated light sources that produce the modulated light beams. Upon detecting a new facet rotating into position after the last element of the table has been obtained, the first element of the table is obtained.

It is an aspect of certain embodiments to generate and use an index signal. An index signal indicates that the MPA has made a complete revolution and is beginning a new one. An index sensor that detects complete revolutions based on the absolute position of the rotational angle of the MPA can generate an index signal. The signal indicating a new facet rotating into position can be used to generate an index signal by counting N facets which indicates a complete revolution.

It is yet another aspect of certain embodiments that the absolute position of the rotational angle of the MPA is not needed to be known to generate a compensation signal. In these embodiments, an additional sensor that detects the absolute position of the rotational angle of the MPA is not needed. However, a sensor that detects the relative position of the MPA is required. This task can be accomplished by passing the SOS pulses through an N element counter. Where, as above, N is the number of facets on the MPA. For every N pulses, the N element counter generates 1 pulse. As such, an index signal can be produced by counting SOS pulses. The first facet after the index signal can then be used as a reference facet, such that all compensation tables begin with the compensation value appropriate for this first facet after the index signal. Subsequent compensation values are those values appropriate for the subsequent facets.

It is a yet further aspect of the embodiments to print a test pattern and to analyze it to detect periodic print density variation, such as banding, which arises from MPA imperfections. As discussed above, MPA issues include vibrations of the MPA, improper rotation of the motor polygon assembly, and variations in the spacing and intensity of a multiple beam MPA. If the print density variation are unacceptable, then they can be mitigated with compensation. Calculating N new compensation values and putting them in order produces a new compensation table. The best phase at which the new compensation table works is then determined. The best phase means ensuring that the correct compensation value corresponds with each facet and that the compensation value used as the current compensation advances as the facet rotates into position.

It is also an aspect of certain embodiments to use the test pattern to determine the compensation parameters. This test pattern can be used to calculate a system gain without interference from the banding caused by the MPA facets. The system gain can be used to directly calculate compensation values.

It is a further aspect of certain embodiments to produce a new compensation table and then print a test pattern in order to ascertain the effectiveness of the new compensation table. If the quality is unacceptable, then another new compensation table can be produced and tested.

Another aspect of the certain embodiments is to find the phase by measuring the interference between the fundamental banding and the induced banding at various relative phase values and fitting a sine wave to the resultant measurements. The period of the sine wave is N*M lines where, as above, N is the number of MPA facets and M is the number of modulated beams. The trough of the sine wave indicates the best phase for the compensation table. Three resultant measurements are required for fitting the sine wave, additional resultant measurements can reduce errors in the fit.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION

The particular values and configurations discussed in these non-limiting examples can be varied and are cited merely to illustrate embodiments and are not intended to limit the scope of the invention.

Figure 1:
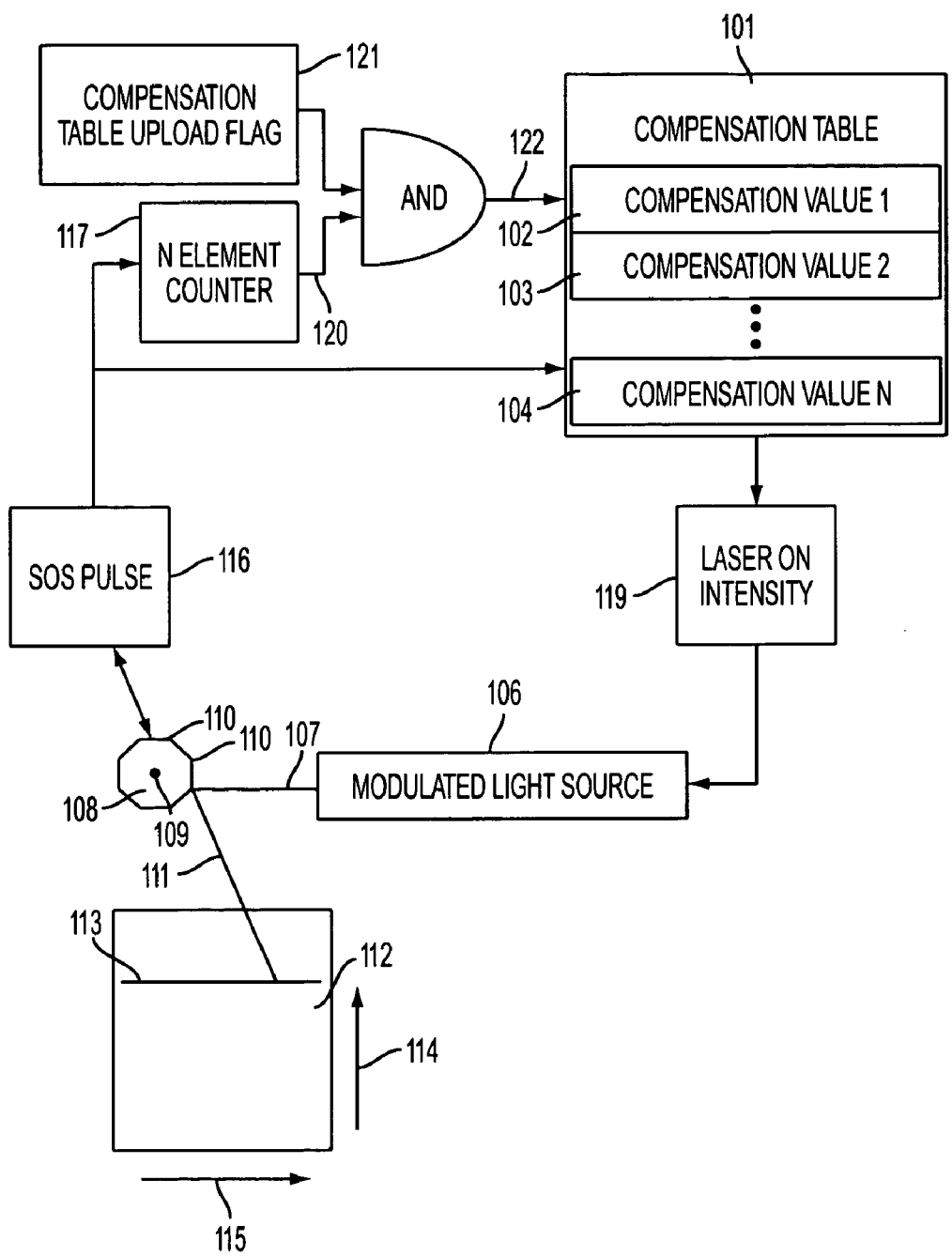
FIG. 1 illustrates a system for using a compensation table to modulate a light beam during production of scan lines in accordance with aspects of the embodiments.

FIG. 1 illustrates a system for using a compensation table to modulate a light beam during production of scan lines in accordance with aspects of the embodiments. A compensation table 101 has a first compensation value 102, a second compensation value 103 and so on up to an Nth compensation value 104. A motor polygon assembly 108 has N facets 110 arranged around a rotational axis 109. A modulated light source 106 produces a modulated light beam 107 that is reflected off a facet 110 of the MPA 108. As the MPA 108 spins about the rotational axis 109 a reflected modulated beam 111 traces a scan line 113 across a photoreceptor 112. The photoreceptor 112 moves in the process direction 114. The scan line 113 is nearly perpendicular to the process direction 114 and parallel to the cross process direction 115.

A SOS pulse 116 is generated whenever a new facet 110 moves into position. When a facet 110 moves into position, it begins to reflect the modulated beam 107 to cause the reflected modulated beam 111 to trace a scan line 113. An N element counter 117 produces an index signal 120 upon every complete revolution of the MPA 108. When a new set of compensation values are uploaded, the new compensation values replace the current compensation values. After the new compensation values are written, the compensation table upload flag 121 is set high. Upon the next pulse from the N element counter 117, a trigger pulse 122 is sent to the compensation table. This pulse will cause the next compensation value output as the laser on intensity 119 to be compensation value 1 102. In this way, the first compensation value 102 can be used for the same facet when the compensation values are changed.

Figure 2:
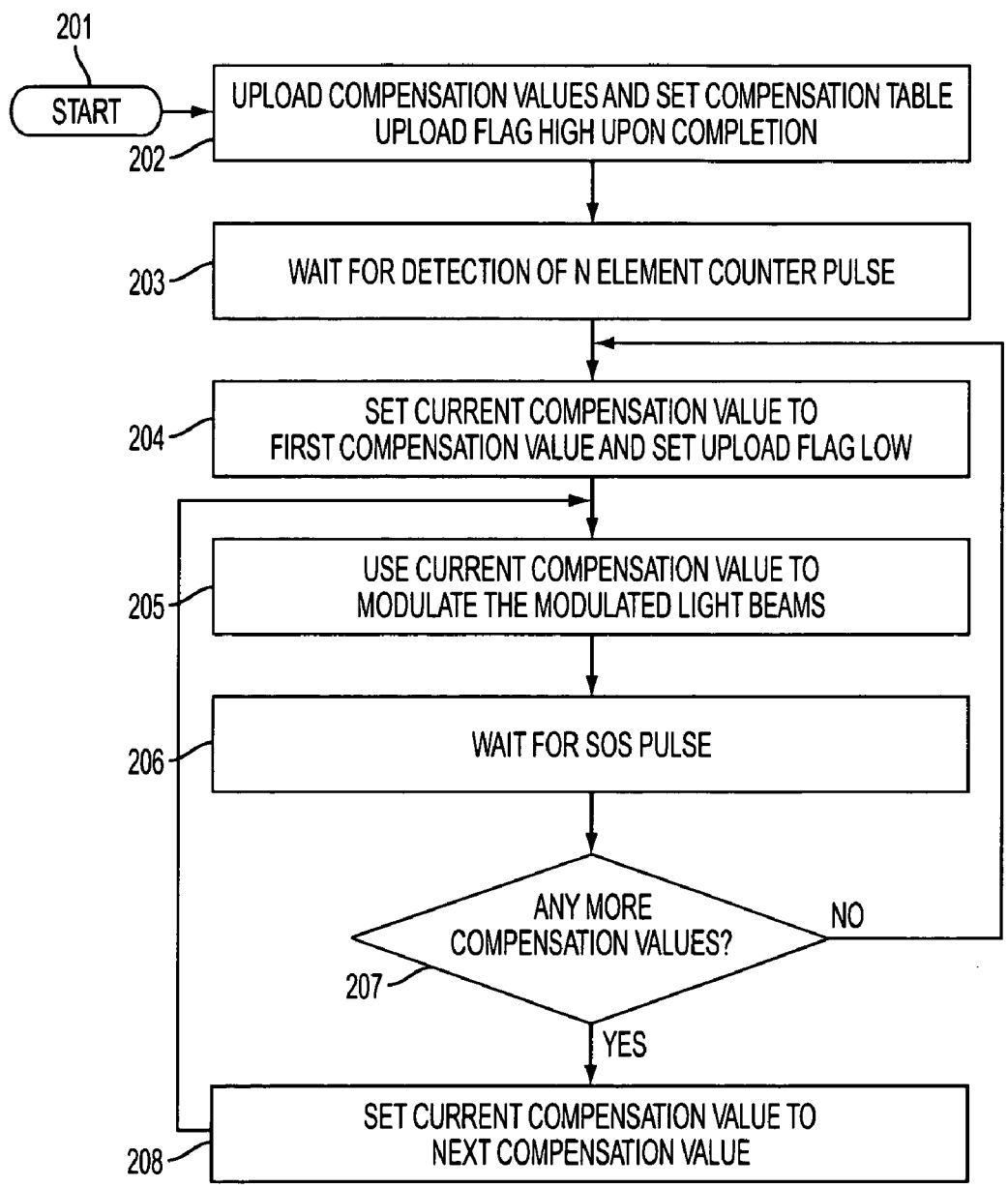
FIG. 2 illustrates a high level flow diagram of loading new compensation values and beginning the scan line dependent modulation of the laser intensity in accordance with aspects of the embodiments.

FIG. 2 illustrates a high level flow diagram of loading new compensation values and beginning the scan line dependent modulation of the laser intensity in accordance with aspects of the embodiments. After the start 201 compensation values are uploaded to the compensation table. Upon completion of the upload, the compensation table upload flag is set high 202. The N element counter, which has been triggering on a particular facet as the MPA rotates, is now enabled to send a pulse to the compensation table. Upon receipt of the trigger from the N element counter 203, the current compensation value is set to the first compensation value and the upload flag is set low 204. The upload flag is set low until there is a need to upload new compensation values. The current compensation value is used to modulate the light intensity 205. Next, the process waits for the next SOS pulse 206 which occurs when the next scan line is due to begin. As the next facet rotates into position, the compensation table is checked for more compensation values 207. If there are none, the current process loops back to setting the current compensation value to the first compensation value 204. Otherwise, the current compensation value is set to the next compensation value 208 and the process loops back to using the current compensation value to modulate the modulated light beam 205.

Figure 3:
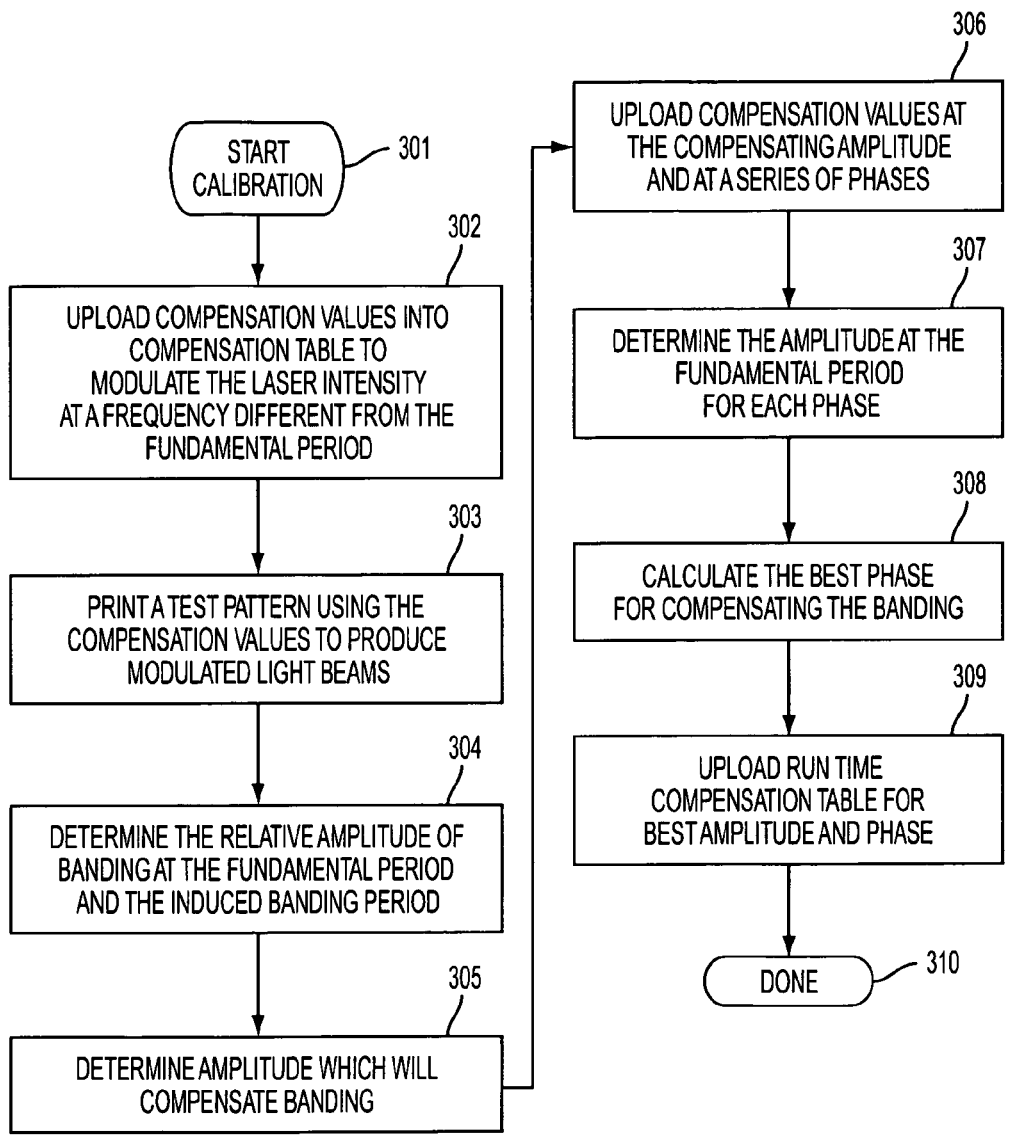
FIG. 3 illustrates a high level flow diagram of obtaining a compensation table that reduces banding to produce documents of acceptable quality in accordance with aspects of the embodiments.
Figure 4:
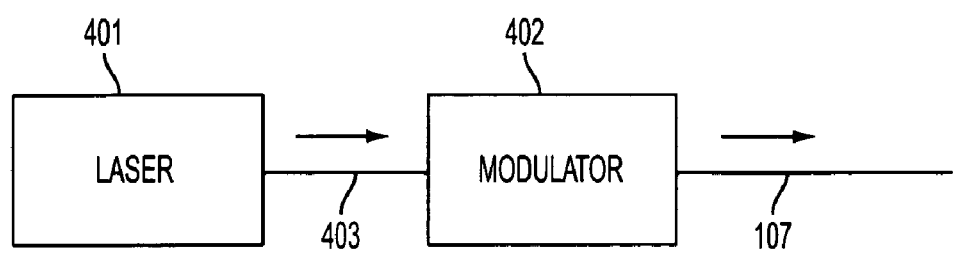
FIG. 4, labeled as prior art, illustrates one way to obtain a modulated light beam.
Figure 5:
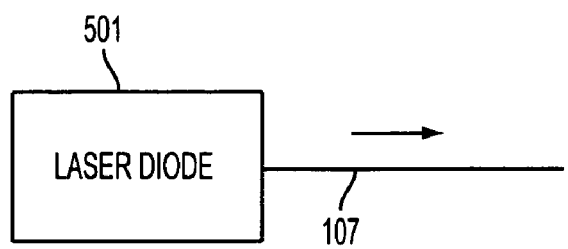
FIG. 5, labeled as prior art, illustrates another way to obtain a modulated light beam.
Figure 6:
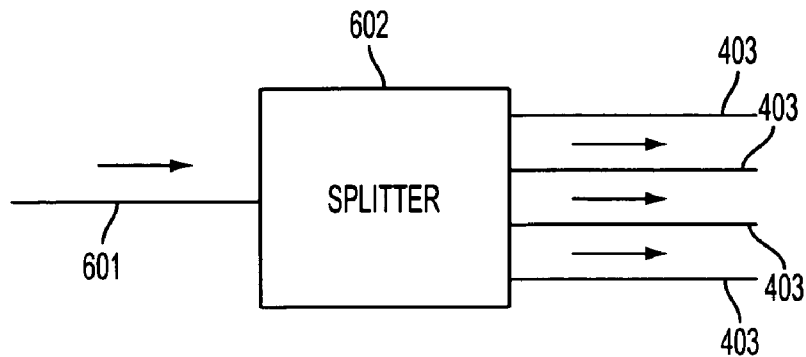
FIG. 6, labeled as prior art, illustrates one way to obtain multiple light beams.
Figure 7:
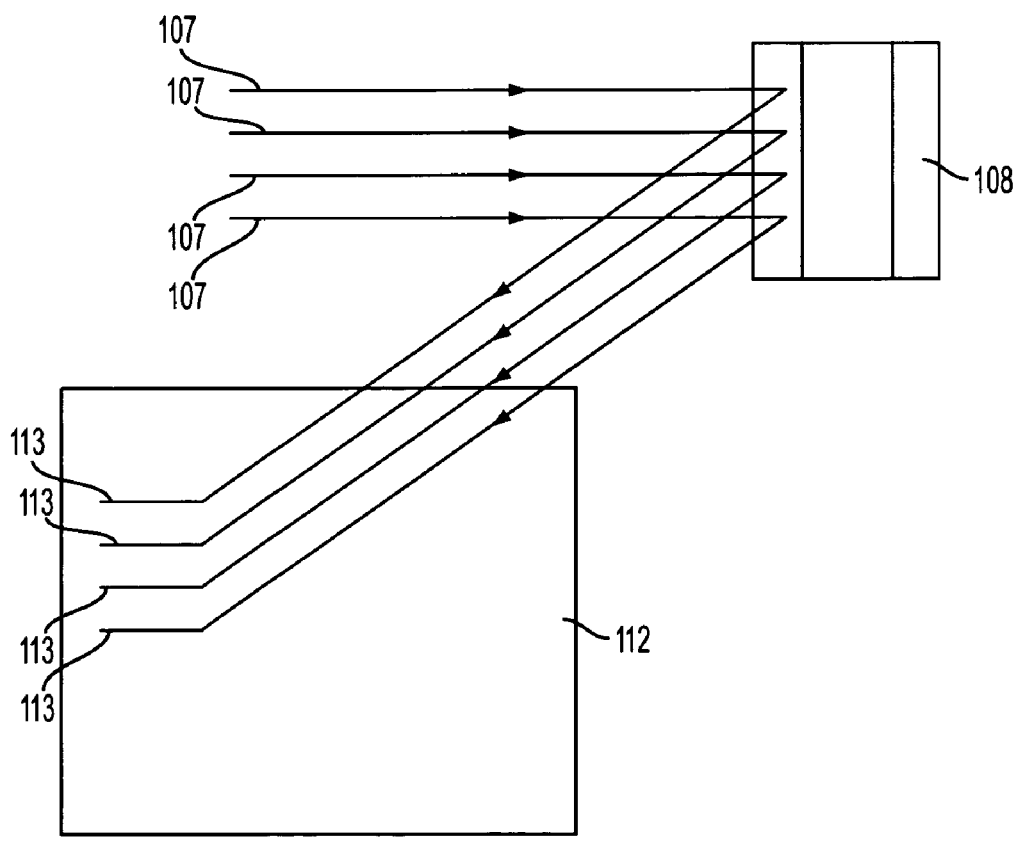
FIG. 7, labeled as prior art, illustrates a motor polygon assembly (MPA) causing numerous modulated light beams to concurrently produce multiple scan lines one a substrate.

FIG. 3 illustrates a high level flow diagram of obtaining the elements of the compensation table that compensates banding to produce documents of acceptable quality in accordance with aspects of the embodiments. After the start 301 known compensation values are uploaded to the compensation table 302. The purpose is to calibrate the banding effects of the compensation values on a print. In one embodiment, a compensation table with 2N compensation values is created, where N is the number of facets on the polygon. The intensity of each scan line is chosen to produce an induced sinusoidal pattern. A single period of the induced sinusoidal pattern is introduced, where the period is 2N and the amplitude is $V_T$. The unit of measure for $V_T$ is arbitrary and referred to as "compensation value units". The period 2N is chosen because there will be no banding from the MPA with a period of 2N. In general, different induced banding periods can be chosen. Next, a test pattern is printed using the current compensation values 303. The test pattern is analyzed 304 to determine the amplitude $A_W$ of the MPA banding, which is a fundamental print density variation, at the fundamental banding period, N, and the amplitude $A_T$ of the induced banding, which is an induced print density variation, at the induced banding period, 2N. A simple system model relating the measured amplitude of the induced banding to the amplitude induced by the compensation values is given by $A_T=G(P_T)V_T$, where $G(P_T)$ is the system gain at the period of the test signal. The system gain can then be estimated $G(P_T)=A_T/V_T$. In order to estimate the compensation amplitude, it is assumed that $G(P_W)=G(P_T)$, where $G(P_W)$ is the gain at N, the fundamental banding period. The compensating amplitude, in compensation value units, that will compensate the fundamental banding is determined 305 as $V_C=A_W V_T/A_T$. As such, a corrective pattern that is sinusoidal with period equal to the fundamental banding period and amplitude equal to the compensating amplitude can compensate for the fundamental print density variation when the proper phase, discussed below, is used.

For example, the ratio of the measured banding at the fundamental period, N, and at the induced banding period, 2N, can be used to calibrate the compensation values. Here, the compensation values are 8 bit numbers between 0 and 255, where 0 would produce the minimum laser intensity and 255 would produce the maximum laser intensity. The banding amplitude is measured in units of the measurement device producing amplitudes between zero and 255. A sinusoid of period 2N and amplitude 20 is induced and printed, as indicated in step 303. As discussed above, the amplitude is in compensation value units. Measuring, as in step 304, reveals the measured amplitude of the banding at period N is 4 measurement device units and the measured amplitude of the banding at period 2N is 8 measurement device units. Therefore, the ratio of the induced banding to the fundamental banding is 2. In other words, inducing a sine wave of period N and compensating amplitude 20/2=10 in compensation table units will produce a sine wave of the same amplitude as the fundamental banding.

The density of the test pattern as a function of position in the process direction can be detected on the print or on the drum. The density can be measured with a flatbed scanner, an inline full width array detector, or a point detector. Fourier analysis or other techniques known to those skilled in the art can be used to extract the amplitude of the banding at the desired frequencies. Banding induced by the MPA is periodic with a known period, as discussed above, and Fourier analysis can immediately reveal its presence and magnitude.

Up through step 305, the desired amplitude is determined but not the phase. Phase refers to the alignment between two signals, such as between fundamental banding and induced banding. The phase between the fundamental banding and the induced banding can be determined by printing another test pattern. If the fundamental banding and induced banding are in phase, then they will constructively interfere and the magnitude of the banding on the print will double. If the fundamental banding and the induced banding are 180 degrees out of phase, then they will destructively interfere and the banding at the fundamental frequency will go to zero as desired. Printing a test pattern at three or more phase relationships between the induced banding and the intrinsic banding allows the phase at which destructive interference occurs to be determined. The correct phase can be found by fitting a sine wave to a plot of the measured banding vs. relative angle and determining the relative angle at which the minimum occurs.

Uploading compensation values with the compensation amplitude, fundamental frequency, and a series of phases 306 and then printing a test pattern produces a series of measurable patterns. The phase relationship can be altered by shifting the compensation values in the compensation table. For example, one phase relationship occurs when the first compensation value corresponds to the first facet. Shifting the relationship between the MPA and the compensation table so that the first compensation value corresponds to the fourth facet produces a different phase relationship.

The banding amplitude at the fundamental period is measured for each one of the series of phases 307. As discussed above, the different phases exhibit different levels of constructive and destructive interference. The best phase for compensating, or minimizing, the banding is calculated 308. Compensation values are then uploaded into the compensation table using the best phase and the compensation amplitude 309 so that banding at the fundamental period is minimized before the process is done 310.

One way to cause different phase relationship between the fundamental banding and the induced banding is to create a new compensation table containing I*N+1 compensation values. The new compensation table is produced by repeating the original compensation table I times and then putting in any number, such as zero, as the final compensation value. Using the new compensation table to print a test pattern will result in a shift of which facet corresponds with which compensation value. The shift is one facet and it occurs every I*N+1 lines.

Once the correct phase relation is found to cause destructive interference between the intrinsic banding and the induced banding, the compensation table elements are loaded into the compensation buffer and the calibration phase is exited. Printing of subsequent images occurs using the compensation tables that cause destructive interference.

In an alternate embodiment, the correction amplitude and phase can be used to define a mathematical equation which can be computed on line as the MPA rotates for each facet.

One such mathematical equation is given by:

$$C(n) = V_C \sin\left(\frac{2\pi(n-1)}{N} + \phi_C\right), n = 1, 2, K, N$$

Where C(n) is the compensation value for facet n, $V_C$ is the correction amplitude, $\phi_C$ is the correction phase, n is the facet number, and N is the total number of facets on the MPA.

In another alternate embodiment, the correction amplitude and phase can be iteratively refined using subsequent measurements and feedback control theory. One such iterative refinement algorithm is given by:

$$V_C(k) = \alpha_V V_C(k-1) + f_V(T(k)), k=1,2,K,N$$

$$\phi_C(k) = \alpha_\phi \phi_C(k-1) + f_\phi(T(k)), k=1,2,K,N$$

Where k represents the iteration number, $\alpha_V$ and $\alpha_\phi$ represent gain terms, $f_V()$ and $f_\phi()$ represent correction functions, and T(k) represents the measured test target.

The compensation table and the mathematical equations discussed above can both be used as compensation sources because both produce a compensation value for each MPA facet as that facet produces a scan line.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

The invention claimed is:

1. A method comprising:
   rotating a motor polygon assembly around a rotational axis wherein the motor polygon assembly comprises N facets arranged around the rotational axis and wherein N is an integer greater than one;
   obtaining a current compensation from a compensation source producing N compensation values wherein each one of the N compensation values uniquely corresponds to one of the N facets;
   changing the intensity of M modulated light beams based on the current compensation wherein M is an integer greater than zero;
   producing a multitude of scan lines on a photoreceptor by advancing the photoreceptor along a process path and reflecting the M modulated light beams from each one of the N facets in turn onto the photoreceptor such that each complete rotation of the motor polygon assembly produces M*N scan lines;
   advancing the current compensation from one of the N compensation values to another one of the N compensation values as the motor polygon assembly rotates such that each scan line is affected by only one of the N compensation values; and a compensation table upload flag that synchronizes the modulation signal to the position of the motor polygon assembly when at least one the N facet compensation values is changed.

2. The method of claim 1 wherein the N compensation values compensate for irregularities in the N facets or for irregularities in the rotation of the motor polygon assembly.

3. The method of claim 1 further comprising producing the M light beams with a laser.

4. The method of claim 1 further comprising generating a trigger signal that occurs once every facet in order to synchronize the advancement of the current compensation and the rotation of the motor polygon assembly.

5. The method of claim 4 wherein the trigger signal is a start of scan signal.

6. The method of claim 4 wherein the trigger signal is sensed from the movement of the motor polygon assembly.

7. The method of claim 1 wherein an index signal is generated once every full rotation of the polygon by counting start of scan trigger signals.

8. The method of claim 1 further comprising producing the M modulated light beams with a diode laser.

9. The method of claim 8 wherein the diode laser uses the compensation values to change the intensity of the M light beams.

10. A method comprising:
spinning a motor polygon assembly comprising N facets arranged around a rotation axis wherein N is an integer greater than one;
using a compensation table comprising P compensation values to modulate M modulated light beams wherein M is an integer greater than zero and P is greater than the number of facets on the polygon;
setting the P compensation values to produce an induced sinusoidal pattern having an induced banding period wherein the induced banding period does not equal a fundamental banding period and wherein the fundamental banding period is M*N scan lines;
printing a test pattern to produce a pattern on a photoreceptor or a printable substrate by reflecting the M modulated light beams from the motor polygon assembly to produce M*N scan lines for each complete rotation of the motor polygon assembly;
analyzing the pattern for a fundamental print density variation occurring at the fundamental banding period;
analyzing the pattern for an induced print density variation occurring at the induced banding period;
determining the P compensation values required to induce a corrective pattern having an amplitude equal to the amplitude of the fundamental print density variation and a period equal to the fundamental banding period;
setting the P compensation values and printing the test pattern such that the corrective pattern is produced; and
determining a phase relationship between the fundamental print density variation and the corrective pattern wherein the phase relationship causes destructive interference.

11. The method of claim 10 further comprising including a calibration pattern within the test pattern.

12. The method of claim 10 further comprising:
printing a second pattern using the P compensation values to modulate the M modulated light beams;
measuring the second pattern to produce phase measurements; and
calculating a phase relationship based on the phase measurements.

13. The method of claim 12 wherein at least three phase measurements are produced and further comprising fitting a sine wave to the at least three phase measurements.

14. The method of claim 10 further comprising using an iterative refinement algorithm to calculate the amplitude and phase of the corrective pattern.

15. A system comprising:
a motor polygon assembly comprising N facets arranged around a rotation axis;
a modulation signal comprising a facet compensation source producing N facet compensation values wherein each facet compensation value uniquely corresponds to one of the N facets;
at least one modulated light source producing at least one modulated light beam wherein M is the number of modulated light beams;
a photoreceptor advancing along a process path such that reflecting the at least one modulated light beam from the motor polygon assembly produces M*N scan lines on the photoreceptor for every complete rotation of the motor polygon assembly; and
a compensation table upload flag that synchronizes the modulation signal to the position of the motor polygon assembly when at least one the N facet compensation values is changed.

16. The system of claim 15 wherein the at least one modulated light beam is at least one modulated laser beam.

17. The system of claim 15 wherein the at least one modulated light source is a laser diode.

18. The system of claim 15 further comprising a trigger that generates a trigger signal every time any one of the N facets rotates past the trigger in order to synchronize the advancement of the current compensation and the rotation of the motor polygon assembly.

19. The system of claim 18 where the trigger signal is a start of scan signal.

20. The system of claim 18 where the trigger signal is sensed from the movement of the motor polygon assembly.

21. The system of claim 18 further comprising an indexing element that produces an index signal wherein a single index signal is produced for every N facet signals such that the modulating signal can be synchronized to the same facet of the motor polygon assembly.

22. The system of claim 15 further comprising an index element that senses movement of the raster output scanner and produces an index signal upon each complete revolution of the raster output scanner such that the modulating signal can be synchronized to the spinning of the raster output scanner.

* * * * *